Oct. 2, 1951  L. A. PAINE  2,569,868
BALANCED THERMAL DEMAND METER
Filed March 5, 1947
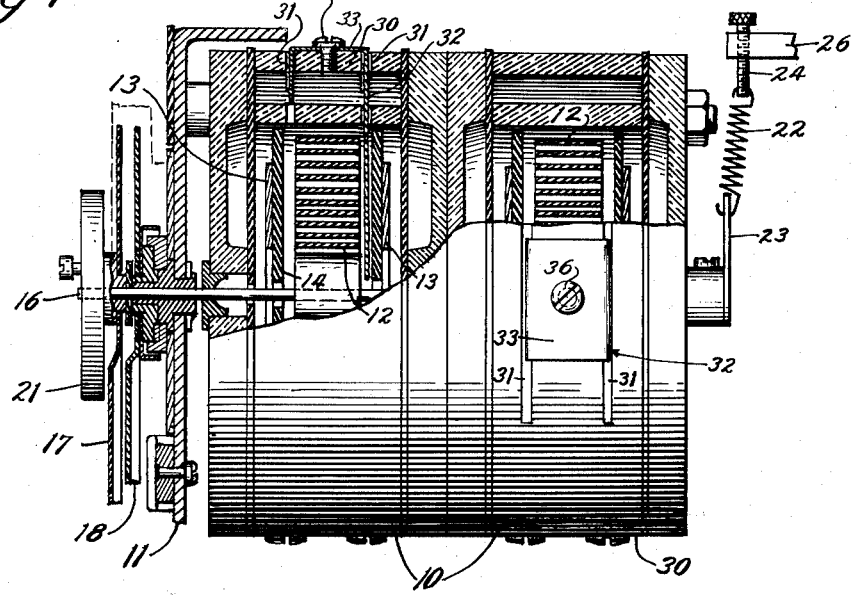
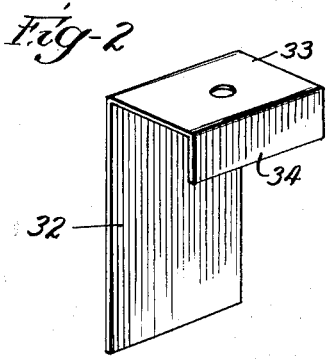 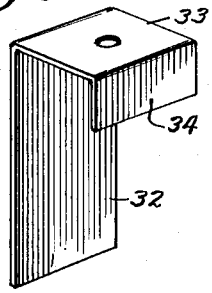 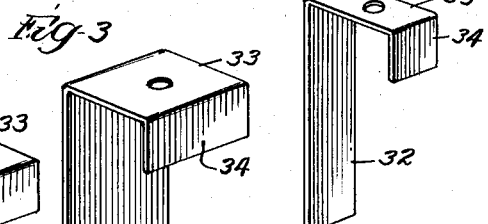
Inventor,
Louis A. Paine
By:- Louis Robertson  Atty Patented Oct. 2, 1951

2,569,868

UNITED STATES PATENT OFFICE 2,569,868

BALANCED THERMAL DEMAND METER

Louis A. Paine, West Lafayette, Ind., assignor to Duncan Electric Manufacturing Company, La Fayette, Ind., a corporation of Illinois Application March 5, 1947, Serial No. 732,470

6 Claims. (Cl. 171—34)

In thermal demand meters for polyphase circuits, there are two heater circuits, one responsive to one pair of wires and the other responsive to another pair of wires. Both of these heater circuits, however, heat the same heat-responsive elements and hence actuate a common indicator. The demand indicated is, therefore, the demand of the entire circuit, there being no segregated indication of the demand as to each phase or pair of wires.

When two heating elements responsive to different conditions act on a single indicator, the calibration of the device as a whole presents a problem. Usually the most convenient method of making calibrating adjustments is by application of adjusting forces to the common indicator or its shaft. Unless the two heating elements are balanced so that under like conditions they will have the same driving effect, the calibrating adjustments applied to their common indicator will not result in dependable accuracy. If the adjustment is made while only one of the heating elements is energized, the adjustment will be right for that element, but it will necessarily be wrong for the other element having a different effect under like conditions. If the adjustment is made while both elements are equally energized, it will be inaccurate under all other conditions, generally speaking.

According to the present invention, these difficulties are overcome with respect to a thermal demand meter by providing means for bleeding or dissipating from any thermal heating element, which would otherwise have a greater driving effect under given conditions than its associated heating element, enough heat to bring the two driving effects into balance. The means chosen is one which is extremely simple, which lends itself to variation for different degrees of unbalance, and which takes up substantially no room in the already compact unit.

Additional objects and advantages of the invention will be apparent from the following description and from the drawings in which:

Figure 1 is a side view of the thermal demand meter unit with portions broken away and shown in section; and Figs. 2, 3, and 4 are perspective views of each bleeding device of different bleeding capacities for use in conjunction with the structure of Fig. 1.

Although the law requires a full and exact description of at least one form of the invention, such as that which follows, it is, of course, the purpose of a patent to cover each new inventive concept therein no matter how it may later be disguised by variations in forms or additions of further improvements; and the appended claims are intended to accomplish this purpose by particularly pointing out the parts, improvements, or combinations in which the inventive concepts are found.

General description

In the form of the invention chosen for illustration, the thermal demand meter unit may be supported by any suitable support plate 11. This may, for example, be the face plate of a watthour meter. A pair of insulating housings 10 are carried by the support plate 11. Within each housing is a bimetallic coil 12 which is heated by heater plate 13 to which may be secured insulating members 14.

One end of each bimetallic coil is secured to the housing and the other end is secured to an indicator shaft 16. The shaft 16 carries an indicator or sweep hand 17. The hand 17 is often called a pusher because there is usually provided a second indicator 18 which is pushed by indicator 17 to the most advanced point to which the indicator 17 is actuated. Thus the indicator 18 is a maximum demand indicator. It is free of the shaft 16 although rotatable about its axis.

The indicator 17 may be biased toward a position adjacent the zero on an associated scale by a hair spring 21 and a full load spring 22.

For the purpose of the present discussion, it may be assumed that when the meter has been connected in the circuit for a sufficient time to reach a stable condition and when there is no load on the circuit the hair spring 21 is adjusted so that it merely counterbalances any effect the bimetallic coil 12 may have to move the indicator 17 away from the zero position. At the same time, the crank arm 23 will be exactly aligned with the spring 22 so that it exerts no torque on the shaft 16.

Calibrating adjustment

As the load on the circuit increases, the heaters 13 will influence the bimetallic coils 12 so as to actuate the pointer 17. When the load has been maintained constant long enough for the meter to become stabilized, the indicator 17 should indicate the load on the circuit, this being the demand under the stated condition. In order to calibrate the meter so that it will indicate the demand accurately, the tension on spring 22 may be adjusted. The adjusting means has been diagrammatically represented by a screw 24, carried by a suitably fixed support 26. With the meter stabilized at a given known load, the screw 24 may be adjusted until the indicator 17 indicates this load.

Temperature compensating means may also be provided in conjunction with the spring 22, but it has been omitted for the purpose of simplification.

Need for balance

Unless the heaters connected in the two different heater circuits respond exactly alike to like conditions, they cannot both be simultaneously adjusted accurately by the screws 24. Thus, if it be assumed that under given load the rear heaters (in one circuit) actuate shaft 16 a little more strongly than the front heaters (in the other circuit), an adjustment of the tension of spring 22 which is correct for the front heaters will be too weak for the rear heaters. If the two circuits are jointly responsive to the same load conditions, this makes no difference, because they are always energized equally. If, however, they are responsive to different load conditions, as when they are connected to different points or phases in a polyphase circuit, they will usually be energized unequally and will fail to give proper indication of the demand unless the common adjustment is correct for each of them alone.

The common adjustment cannot be correct for each of the phases or heater circuits alone unless they are perfectly balanced with respect to one another. Of course, from a commercial standpoint, perfection is not required, but ordinary manufacturing practices result in more variation than is permissible. The purpose of the present invention is to provide a practical means for balancing the two meter circuits to eliminate nearly all of the inequalities resulting from manufacturing variation.

Balancing devices

According to the present invention, at least one of the double-walled cylinders forming part of the housings 10 is provided with a pair of slots 31, through either of which a bleeding strip 32 may be inserted. The bleeding strip 32 is formed of a metal which has high conductivity for heat. Its inner portion lies between one of the heaters 13 and the bimetallic coil 12. In this position it is fairly remote from the other heater 13. For that reason it draws much more heat from the rear heater 13, if it is adjacent to that heater, as shown, than from the front heater 13. The heat absorbed by the bleeder 32 passes out through the bleeder through the slots 31 in the double-walled cylinder 30 where it is dissipated to the surrounding air. Part of the heat may be dissipated directly from the exposed portion 33 of the bleeder 32 to the air and part may be dissipated by conduction from the bleeder to the outer wall of double-walled cylinder 30.

The amount of heat which is dissipated under given load conditions will depend upon several factors. Most important of these is the size of the bleeding device. According to the present invention, a series of bleeding devices of different sizes are provided. Three of these sizes are shown in Figs. 2, 3, and 4. In practice, several other sizes would also be at hand. Preferably all of the sizes are identical with one another except for the width, as shown. The narrower size not only has less surface exposed for absorbing heat from the heater 13 but it also has less cross section for conducting the heat out through the insulating casing and less exposed area for dissipating the heat to the surrounding air.

In working with a particular type of meter, as on the production line of one manufacturer, it will soon become apparent that certain sizes of bleeders will produce approximately certain amounts of correction. In fact, each size of bleeder could be placed in a compartment marked with the amount of correction which it will produce. Hence, the meter calibrator may run a test with first one phase or heater circuit on a given load and then another, no bleeder being yet applied, and compare the indications to determine how much stronger one is than the other. The bleeder for balancing approximately this amount of excess will then be chosen and inserted through a slot 31 to lie adjacent the heater which has too strong an effect. The choice of the correct size may be checked by another pair of tests.

Usually the choice of the correct bleeding device will provide the right amount of correction for a commercially satisfactory degree of balance. If this should not be true, the bleeding device may be shortened slightly by clipping a piece from its inner end, being withdrawn for this purpose.

When the two heater circuits have thus been approximately balanced, the meter may be calibrated by the usual additional steps, including adjustment of tension on the spring 22.

The bleeding devices 32 have been shown with a short leg 34 which is inserted into the slot 31 which is not being used for the main leg of bleeding device 32. This avoids having any exposed free corners and also partially closes the extra slot 31.

The bleeder 32 may conveniently be held in place by a screw 36.

In the drawings a bleeder 32 has been shown for each of the units 10. One has been shown in section, and the other has been shown with an end view. This was done merely for the purpose of illustration. In practice, usually only one bleeder will be used at a time. In fact, it is preferred that the slots 31 be omitted from one of the cylindrical double walls 30, even though they are so narrow that almost no heat is lost as a result of their being present.

It will be observed that each of the bimetallic coils together with its heater unit is substantially surrounded by double-walled construction. Thus, each heating chamber is fairly well insulated from the surrounding air. As a result, it will usually be sufficient to bleed only a very small amount of heat from the chamber to produce balance.

From the foregoing it is seen that a very simple construction is provided which permits the balancing of the two heater circuits in a polyphase thermal demand meter, so that a single calibration thereafter will be accurate for both meter circuits.

I claim:

1. A thermal demand meter including a shaft, a pair of thermally responsive members associated with the shaft in driving relationship, a heat-insulating housing surrounding each thermally responsive member, heating means within each housing, heating circuits for connecting certain heating means to different pairs of wires, and heat-bleeding means extending through the heat-insulating housing surrounding one unit exposed to absorb heat from the inside thereof selectively from the heating means of one heating circuit, and exposed to dissipate heat to the outside thereof; said heat-bleeding means comprising a thin strip of sheet copper, having a flat portion extending through a narrow slot in the housing and extending adjacent to a heater assembly, and means for removably securing the bleeding member to the housing, said bleeding member being adapted to be readily withdrawn for replacement by another bleeding member of different bleeding characteristics.

2. A thermal demand meter including a shaft, a pair of thermally responsive members associated with the shaft in driving relationship, a heat-insulating housing surrounding each thermally responsive member, heating means within each housing, heating circuits for connecting certain heating means to different pairs of wires, and heat-bleeding means extending through the heat-insulating housing surrounding one unit exposed to absorb heat from the inside thereof selectively from the heating means of one heating circuit, and exposed to dissipate heat to the outside thereof; said heat-bleeding means having a flat portion extending through a narrow slot in the housing and extending adjacent to a heater assembly, and means for removably securing the bleeding member to the housing, said bleeding member being adapted to be readily withdrawn for replacement by another bleeding member of different bleeding characteristics.

3. A thermal demand meter including a shaft, a pair of thermally responsive members associated with the shaft in driving relationship, a heat-insulating housing surrounding each thermally responsive member, heating means within each housing, heating circuits for connecting certain heating means within the same housing to different pairs of wires, and heat-bleeding means extending through the same heat-insulating housing exposed to absorb heat from the inside thereof selectively from the heating means of one heating circuit more than from the other heating means, and exposed to dissipate heat to the outside thereof.

4. A thermal meter including thermally responsive means, a heat-insulating means surrounding the thermally responsive means, a plurality of heating means, heating circuits for connecting certain heating means within the same housing to different pairs of wires, and heat-bleeding means extending through the same heat-insulating means exposed to absorb heat from the inside thereof selectively from the heating means of one of the heating circuits more than from the other heating means, and exposed to dissipate heat to the outside thereof.

5. A thermal demand meter including an indicator shaft, a pair of bimetallic coils differentially associated with said shaft, insulating housings surroundings said bimetallic coils, heaters within said housings for heating said coils, heating circuits for connecting certain of said heaters within the same housing to different pairs of wires to heat said coils differentially, a strip of metal extending through the same housing which is at a higher temperature under load conditions than the surrounding air, and extending adjacent to the heater therein of one of the heating circuits for bleeding more heat from said heater than from the other heater to bring the heating effects of the two circuits closer to relative balance.

6. A thermal demand meter including a shaft, a pair of thermally responsive members associated with the shaft in driving relationship, a heat-insulating housing surrounding each thermally responsive member, heating means within each housing, heating circuits for connecting certain heating means within the same housing to different pairs of wires, and heat-bleeding means extending through the same heat-insulating housing exposed to absorb heat from the inside thereof selectively from the heating means of one heating circuit more than from the other heating means, and exposed to dissipate heat to the outside thereof; and means for removably securing the bleeding member to the housing, said bleeding member being adapted to be readily withdrawn for replacement by another bleeding member of different bleeding characteristics.

LOUIS A. PAINE.

REFERENCES CITED

The following references are of record in the file of this patent:

UNITED STATES PATENTS

| Number | Name | Date |
|---|---|---|
| 572,380 | Simonds | Dec. 1, 1880 |
| 1,416,544 | Barzen | May 16, 1922 |
| 1,811,244 | Paine | June 23, 1931 |
| 2,118,742 | Sprole | May 24, 1938 |
| 2,345,028 | Bradshaw | Mar. 28, 1944 |